United States Patent

[11] 3,548,738

| [72] | Inventors | James McDevitt;<br>Victor F. Hildebrand, P.O. Box 4101,<br>Clearwater, Fla. 33518 |
|---|---|---|
| [21] | Appl. No. | 781,512 |
| [22] | Filed | Dec. 5, 1968 |
| [45] | Patented | Dec. 22, 1970 |

[54] HOT DOG VENDING MACHINE
3 Claims, 11 Drawing Figs.

[52] U.S. Cl. ............................................. 99/332,
99/341, 99/342, 99/357, 99/358, 221/150
[51] Int. Cl. ............................................. A47j 27/62
[50] Field of Search ............................................. 99/341,
342, 332, 357, 358, 171; 221/150; 219/(Inquired)

[56] References Cited
UNITED STATES PATENTS

| 2,256,976 | 9/1941 | Ford | 99/358 |
| 2,287,956 | 6/1942 | Aff | 99/358X |
| 2,794,384 | 6/1957 | Sierk et al. | 99/357 |
| 2,930,312 | 3/1960 | Richman et al. | 99/358X |
| 3,117,511 | 1/1964 | Everett | 99/358X |
| 3,381,605 | 5/1968 | Smith | 99/357X |

*Primary Examiner*—Billy J. Wilhite
*Attorney*—Karl L. Spivak

ABSTRACT: A hot dog vending machine comprising a refrigerated food storage compartment, a pair of vertically spaced actuating bars and a composite hot dog and electrode cooking package stored within the said food compartment, the said package containing a pair of spaced electrodes each intimately bonded to the hot dog and retained within a cylindrical cardboard container which has been preformed for cooperation with the spaced actuating bars.

PATENTED DEC 22 1970
3,548,738
SHEET 1 OF 2
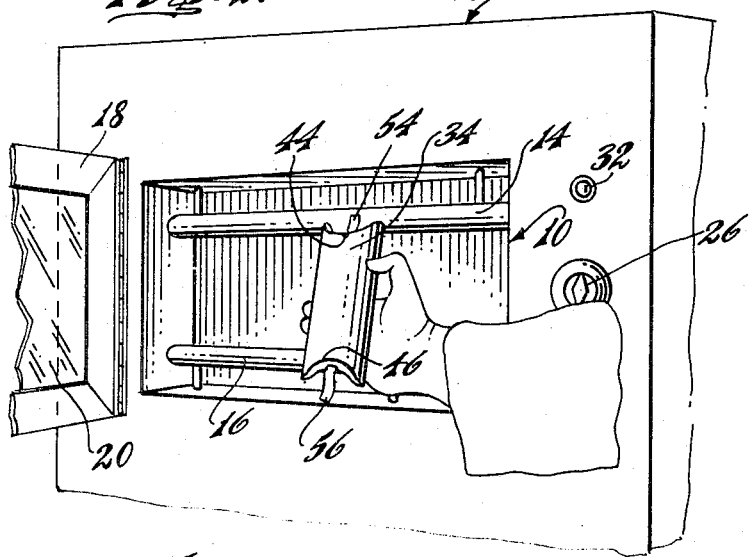
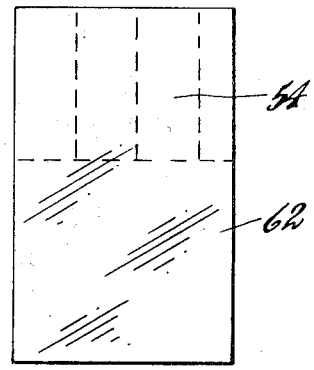
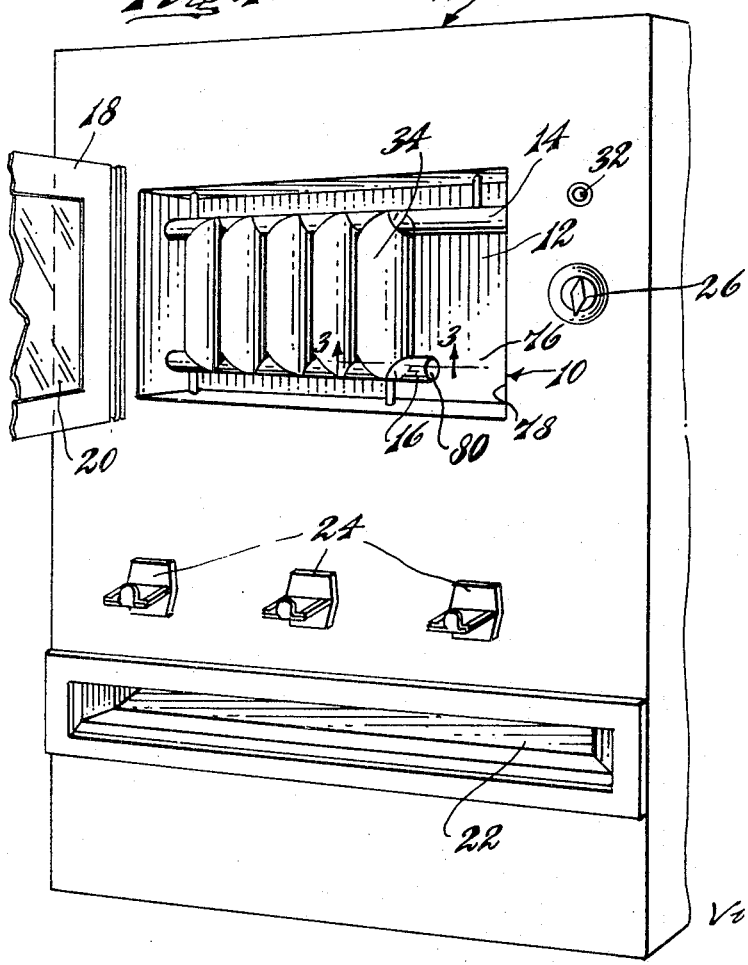
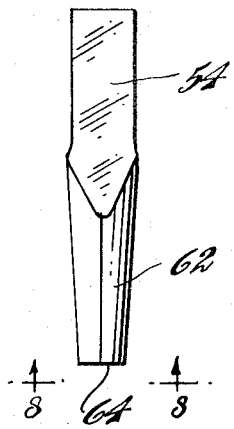
INVENTORS
James McDevitt
Victor F. Hildebrand
BY
Karl L. Spivak
ATTORNEY

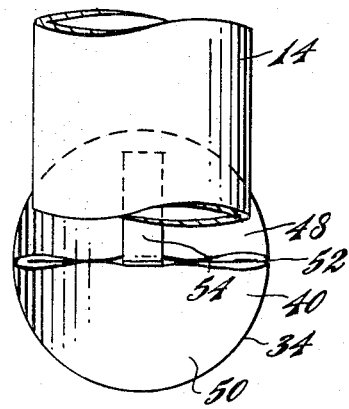
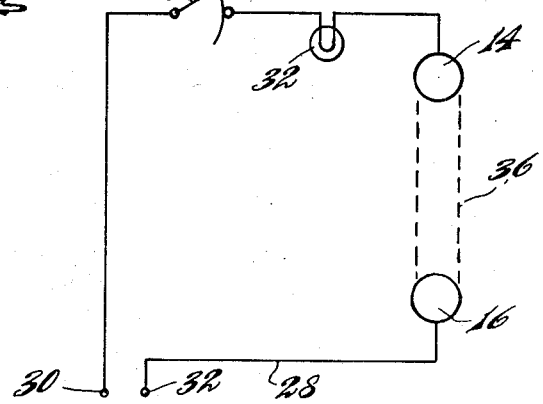
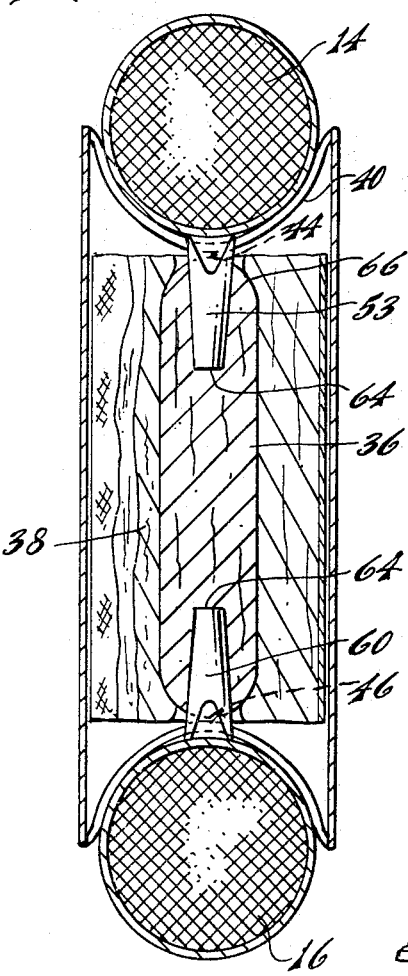
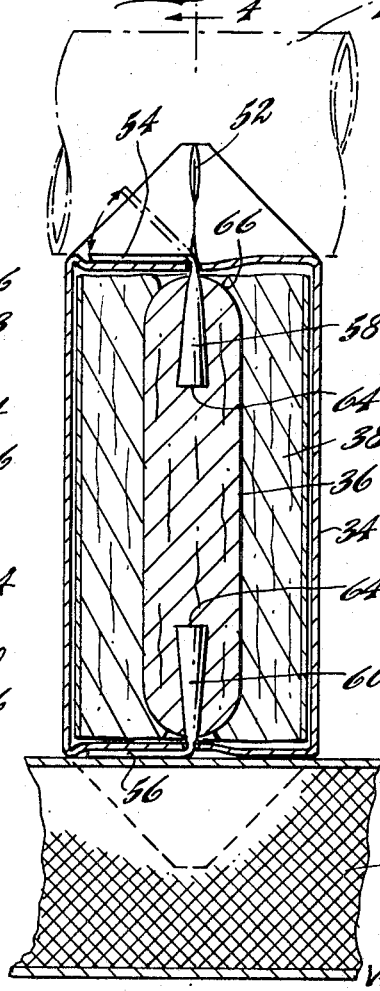
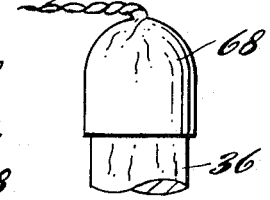
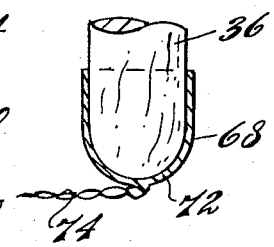

HOT DOG VENDING MACHINE

This invention relates to the general art of machine vendible food particles and more particularly is directed to a vending machine that is capable of heating a hot dog from a refrigerated condition to a cooked condition in an extremely short period of time.

The present invention relates to a hot dog vending machine that includes a refrigerated food compartment wherein prepackaged hot dogs and carton assemblies are placed for storage without spoiling over extended periods of time. In this manner, a hot dog vending machine has been provided that greatly improves over prior art models in that the required frequency of service visits has been greatly reduced. Further, the present invention greatly simplifies handling procedures over prior art models in that the hot dog assembly has been completely preprocessed and prepared in such a manner that the food itself need never be handled until ready to eat. In this manner, all of the operating difficulties presented by the prior art devices in having separate provisions for the hot dogs, rolls and seasonings, have been herein eliminated. In accordance with the instant invention, the hot dog and roll combination is prepared at the vendors' plant and seasonings such as mustard, relish, etc., are applied prior to packaging. The preseasoned roll and hot dog combination is then wrapped in a napkin for the use of the purchaser and placed within a specially shaped, cylindrical, heavy cardboard carton. When considered necessary, the entire package may be enclosed within a sealing type of envelope and inserted into a freezer to thereby preserve the freshness of the combination indefinitely so long as the package is stored under freezing conditions.

Novel electrodes have herein been provided of relatively lightweight metal which may be easily and inexpensively formed into a number of shapes best suited for use with the spaced actuating bars of the vending machine. In order to maintain the best possible contact between the electrode and the hot dog itself, pairs of electrodes have been employed, each electrode being actually imbedded into the meat of the hot dog to thereby assure positive circuit continuity at all times. The imbedding of the electrode into the end of the hot dog is especially important in view of the refrigerated or frozen conditions under which the hot dog package is normally stored in order to best practice this invention.

The soft, light metallic electrodes of the present invention greatly improve over prior art electrodes in that positive contact is assured under all conditions thereby providing a hot dog package that is capable of storage for extended period of time coupled with the assurance of positive cooking instantaneously without adjustment when the hot dog package is applied to the cooking elements of the vending machine. In addition, the electrodes are inexpensive in manufacture and so do not appreciably add to packaging costs of the finished product.

It is therefore an object of the present invention to provide an improved hot dog vending machine and combination vendible hot dog package of the type set forth.

It is a further object of the present invention to provide an improved hot dog vending machine that includes both a refrigerated storage compartment and electric cooking means.

It is another object of the present invention to provide a hot dog vending machine that includes spaced electrical actuating bars which are capable of heating hot dogs from a refrigerated condition to a cooked condition in a relatively short period of time.

It is another object of the present invention to provide a hot dog cooking machine that includes a pair of spaced actuating bars and means to cook several hot dogs thereon simultaneously.

It is another object of the present invention to provide a combination hot dog storage package that is designed to permit storing of perishable foodstuffs in a freezer or refrigerator over extended periods of time without spoilage.

It is another object of the present invention to provide a combination hot dog storage package that includes a cylindrical carton with specially shaped ends for intimate contact with the actuating bars of a hot dog vending machine.

It is another object of the present invention to provide a combination hot dog storage package and soft, metallic electrodes extending through the ends of the package.

It is another object of the present invention to provide a combination hot dog storage package and metallic electrodes, a portion of the electrodes being intimately imbedded within the meat of the hot dog itself.

It is another object of the present invention to provide a hot dog vending machine that is simple in operation, inexpensive in manufacture and rugged in construction.

Other objects and a fuller understanding of the invention will be had by referring to the following description and claims of a preferred embodiment thereof, taken into conjunction with accompanying drawings wherein like reference characters refer to similar parts throughout the several views and in which:

FIG. 1 is a front perspective view of the invention showing a plurality of hot dog containing cartons applied to the actuating bars and arranged in cooking position.

FIG. 2 is a partial, front perspective view showing a single, hot dog containing carton being applied to the actuating bars.

FIG. 3 is a partial, cross-sectional view taken along line 3—3 of FIG. 1, looking in the direction of the arrows.

FIG. 4 is a cross-sectional view taken along line 4—4 of FIG. 3, looking in the direction of the arrows.

FIG. 5 is a partial top plan view of the hot dog carton, portions of the top actuating bar being broken away to show the structure beneath.

FIG. 6 is a lay out view of a soft metallic electrode. FIG. 7 is a side elevational view of the electrode of FIG. 6 after it has been rolled into its final shape.

FIG. 8 is a bottom plan view taken along the line 8—8 of FIG. 7, looking in the direction of the arrows.

FIG. 9 is a side elevational view of a modified type of electrode.

FIG. 10 is a cross-sectional view of the modified type of electrode of FIG. 9.

FIG. 11 is a schematic wiring diagram of the invention.

Although specific terms are used in the following description for the sake of clarity, these terms are intended to refer only to the particular structure of our invention selected for illustration on the drawings and are not intended to define or limit the scope of the invention.

Referring now to the drawings, we show in FIG. 1 a hot dog vending machine generally designated A which has been designed and constructed in accordance with the present invention. The machine A is designed and constructed to be completely self-contained and includes a food cooking area 10 comprising a recessed compartment 12 and a pair of spaced, horizontal actuating bars 14, 16. An openable door 18 covers the compartment 12 and may be provided with a glass panel 20 when so desired so that the purchaser may observe the cooking operations.

The vending machine A also includes a refrigerated food storage compartment (not shown) for use by the vending machine operator. It is contemplated that the vending machine operator will periodically service the machine to provide fresh food packets and to remove coins deposited during the vending operation. The food packets stored within the refrigerated food storage chamber are delivered one at a time at the food delivery opening 22 in response to operation of the vending coin slides 24 in any well-known, conventional manner. A manual timer switch 26 positions upon the front of the machine A at convenient height for ready operation of the cooking circuit 28 by the hot dog purchaser.

The vending machine A is powered in conventional manner by connection to a usual 110 volt, alternating current power source which is wired in well-known manner within the machine to operate both the food storage compartment refrigerator (not shown) and the actuating bar cooking circuit 28. As best seen in FIG. 11, the cooking circuit 28 comprises a series circuit powered by an alternating current source of 110 volts alternating current which is supplied to the terminals 30, 32 in conventional manner from a conventional power source. The manual timer switch 26 connects in series in the circuit 28 to provide a timed interval of electrical energy which is applied at the actuating bars 14, 16 for hot dog cooking purposes. A bulls-eye signal light 32 mounts upon the front of the cabinet A and connects in series with the circuit 28 to give a visual indication of the timed period of operation of the cooking cycle. When the switch 28 turns through its predetermined timed cycle, the light 32 extinguishes to thereby visually indicate to the purchaser that the cooking cycle has been completed and that the hot dog sandwich is ready for consumption. It should be noted that the actuating bars 14, 16 are spaced apart a distance equivalent to the length of the hot dog containing carton 34 and that the hot dog 36 actually completes the electrical circuit 28 between the actuating bars. The passage of electrical current through the hot dog accomplishes the cooking function. As best seen in FIGS. 3 and 4, the carton 34 comprises a cylindrical length of cardboard of diameter sufficient to contain hot dog 36 and roll 38 in combination. The carton ends 40, 42 arcuately bend inwardly to a semicircular configuration of a diameter sized to closely overlie the outer periphery of the cylindrically formed actuating bars 14, 16. The distance between the low points 44, 46 of the semicircular bends and the carton ends 40, 42 is fabricated to be slightly greater than the clear distance between the actuating bars 14, 16 so that when a carton 34 is applied between the actuating bars, a tight fit is thereby assured to thus positively complete the electrical circuit 28.

As best seen in FIG. 5, when the respective halves 48, 40 of the carton end 40 are bent together to form the aforesaid semicircular configuration, an arcuate crack 52 is thereby formed through which the respective tabs 54, 56 of the electrodes 58, 60 to extend to contact the actuating bars 14, 16 when the carton 34 inserts therebetween.

Referring now to FIGS. 6, 7 and 8, it will be observed that the electrodes 58, 60 may be inexpensively formed from a single sheet of lightweight, metallic, electrically conductive material of generally T-shaped configuration. The tab 54 integrally extends from one edge of the electrode base 62 a sufficient distance to assure positive contact with the actuating bars 14, 16 as hereinafter more fully set forth. The base 62 is rolled to a generally cylindrical configuration and thereby provides a circular bottom cutting edge 64 for circularly cutting into the ends 66 of a hot dog 36. As best seen in FIGS. 3 and 4, the electrodes 58, 60 cut into the ends 66 of the hot dog 36 and pierce the meat up to a depth equal to the height of the electrode base 62. In this manner, a positive, intimate electrical contact is assured between the electrodes 58, 60 and the hot dog 36 under all operating conditions. Thus a method has been provided to assure positive electrical contact even when the hot dog packet has been stored under refrigerated or frozen conditions. When packaged, the electrode tabs 54, 56 extend through the carton arcuate cracks 52 and overlie the low points 44, 46 at the carton ends 40, 42 for electrical contact with the actuating bars 14, 16 when the cartons 34 are positioned for the cooking operation. See FIG. 1.

In FIGS. 9 and 10, we show a modified type of electrode construction 68 wherein the electrodes are fabricated in the form of an end cap 70 of a lightweight metallic, electrically conductive material such as sheet aluminum foil. The end cap 70 fits over the respective ends 66 of the hot dog 36 and is fabricated to a size to intimately contact the entire end surface 72 of the hot dog 36. A rolled tab 74 integrally forms with the cap 70 and extends from the top of the end cap 70 to provide a conductive surface for electrical contact with the actuating bars 14, 16.

In order to operate the invention, a coin (not shown) is first inserted into the vending coin slide 24 and the slide is pushed rearwardly into the machine A. In this manner, one hot dog containing carton will automatically be delivered at the food delivery opening 22 in a well-known manner. The purchaser then opens the door 18 and applies the carton 34 between the actuating bars 14, 16. The electrodes 54, 56 overlie the low points 44, 46 of the bent ends of the carton 34 and thus respectively contact a portion of the actuating bar surfaces over the entire length of electrode tabs 54, 56. The carton 34 may be positioned between the electrodes 14, 16 by inserting the carton into the space 76 provided between the end 80 of the actuating bar 16 and the edge 78 of the compartment 12 and then sliding the carton transversely along the actuating bars. If it is desired to cook more than a single hot dog at one time, the carton 34 may be urged further along the bars 14, 16 until sufficient space is provided for all of the desired cartons 34. Alternately, one of the actuating bars 14, 16 may be positioned within the compartment 12 by utilizing spring pedestals (not shown) in well-known manner. In this manner, one bar could be urged away from the other bar against the bias of the pedestal springs until sufficient opening was provided to insert the carton 34 between the bars 14, 16. The spring bias would also serve to assure positive electrical contact between the bars 14, 16 and the tabs 54, 56 under all conditions of operation.

As can be seen in FIGS. 3 and 4, the hot dog roll 38 fits within the carton 34 and is prepacked at the vendor's plant prior to delivery to the vending machine A. Spices such as mustard, relish, etc. may also be applied at the packing plant and the entire hot dog, roll and spice assembly may be wrapped in a paper napkin prior to insertion within the carton 34 so that a completely preseasoned, prepackaged assembly is thus prepared. In this manner, no condiment trays, mustard jars or similar open food containers that present both a health problem and a maintenance problem need be provided at the machine A. Also, it should be noted that the carton 34 acts as a heat insulator during the cooking operation and therefore, the heat generated to cook the hot dog 36 serves also to heat the roll 38 within the carton 34. Thus, a single cooking operation serves to not only cook the hot dog itself, but also to heat the roll and thus make the entire assembly more palatable.

Although we have described our invention with a certain degree of particularity, it is understood that the present disclosure has been made only by way of example and that numerous changes in the details of construction and the combination and arrangement of parts may be resorted to without departing from the spirit and scope of the invention as hereinafter claimed.

We claim:

1. In a coin-operated hot dog vending machine, the combination of:
   a. a cabinet;
   b. a food delivery opening provided in the cabinet,
      1. said food delivery opening delivering hot dog containing cartons in response to the insertion of coins in the said vending machine;
   c. a food-cooking compartment provided in the said cabinet and receiving the said cartons delivered at the food delivery opening,
      1. said food cooking compartment containing a pair of spaced, current receiving actuating bars, and
      2. said compartment being defined between spaced edges, and
         a. said actuating bars being of elongated cylindrical configuration,
            1. said bars incorporating carton-inserting means,
            2. said bars being in stationary, spaced relationship to each other; and
   d. an electrical operating circuit powering the said actuating bars for food cooking purposes.

2. The invention of claim 1 wherein a manual timer switch is provided in the operating circuit to provide a timed period of operation.

3. The invention of claim 1 wherein the stationary carton inserting means comprise one of said bars terminating in an end shorter than the other said bar thereby defining a hot dog carton inserting space between the shortened end of said bar and one edge of the said food cooking compartment.